United States Patent [19]

Leu et al.

[11] Patent Number: 5,113,080
[45] Date of Patent: May 12, 1992

[54] NON-LINEAR DISPLACEMENT SENSOR BASED ON OPTICAL TRIANGULATION PRINCIPLE

[75] Inventors: Ming C. Leu, Pinebrook; Zhiming Ji, Kearny, both of N.J.

[73] Assignee: New Jersey Institute of Technology, Newark, N.J.

[21] Appl. No.: 550,628

[22] Filed: Jul. 10, 1990

[51] Int. Cl.$^5$ .......................................... G01N 21/86
[52] U.S. Cl. ........................................ 250/561; 356/1
[58] Field of Search ............... 250/561; 356/1, 4, 141, 356/152

[56] References Cited

U.S. PATENT DOCUMENTS

| 4,522,492 | 6/1985 | Masunaga | 356/1 |
| 4,717,819 | 1/1988 | Momiyama et al. | 356/4 |
| 4,830,485 | 5/1989 | Penney et al. | 356/1 |

Primary Examiner—David C. Nelms
Attorney, Agent, or Firm—Klauber & Jackson

[57] ABSTRACT

An optical displacement measuring apparatus utilizing triangulation, includes a laser for projecting a laser light beam with a first optical axis onto a surface of an object whose displacement is to be measured; an array of photodetectors for receiving light reflected from the object and for generating a positional signal as an image displacement $\delta$; a condensing lens for receiving the light reflected from the object and for supplying the reflected light to the detector array along a second optical axis intersecting the first optical axis at angle $\theta$, the detector array being inclined at an angle $\phi$ with respect to the second optical axis; a determining device for non-linearly determining surface displacement $\blacktriangle$ as a function of the image displacement $\delta$ and the angles $\phi$ and $\theta$, with the relationship between the image displacement $\delta$, the surface displacement $\blacktriangle$ and the angles $\phi$ and $\theta$ always being identical, regardless of the angle $\phi$.

18 Claims, 6 Drawing Sheets

FIG.3
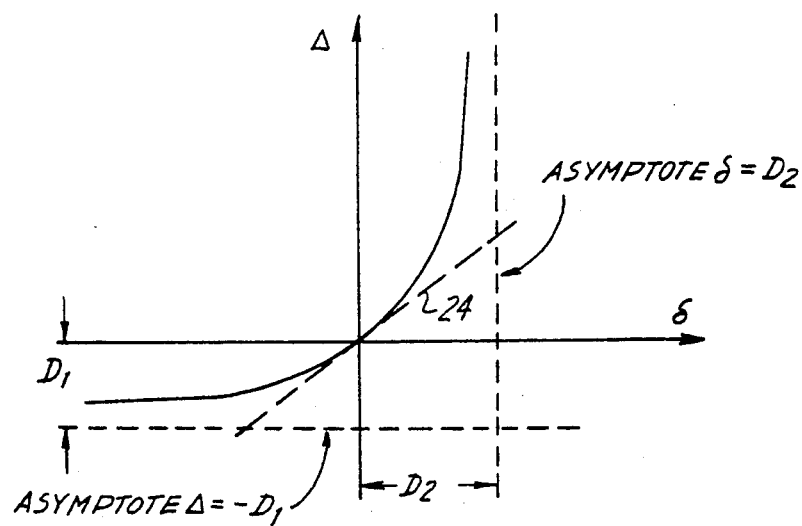
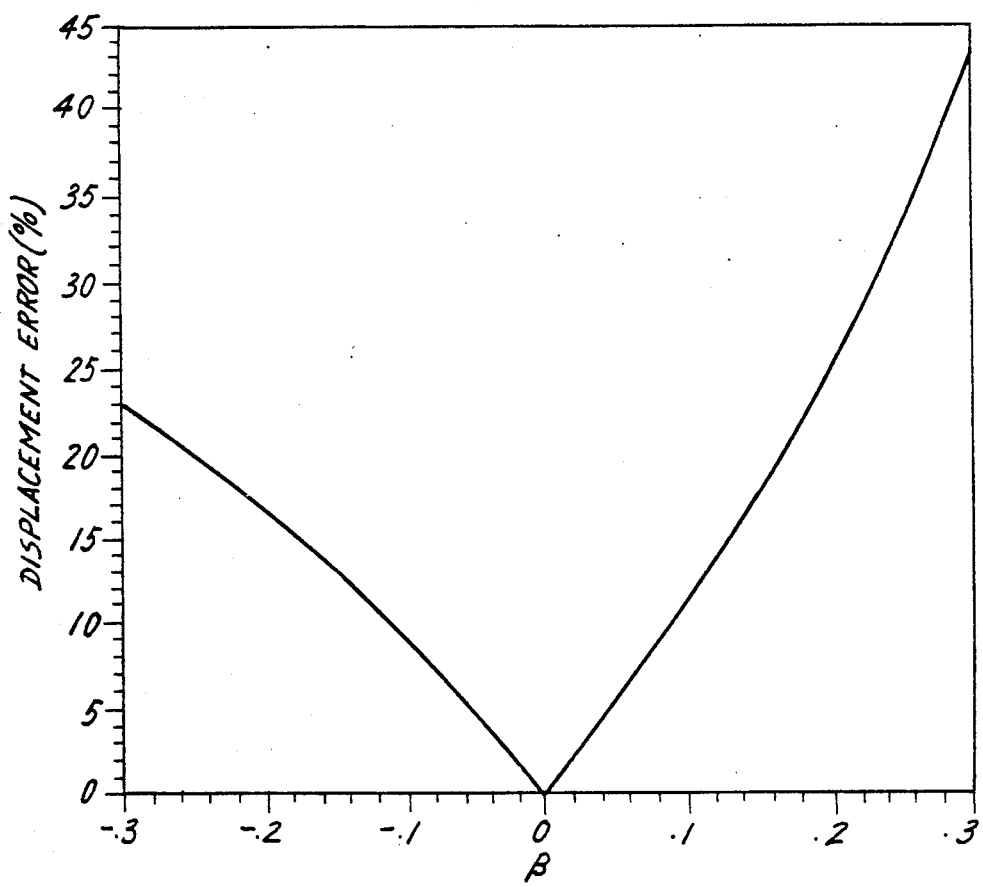
FIG.4

NON-LINEAR DISPLACEMENT SENSOR BASED ON OPTICAL TRIANGULATION PRINCIPLE

BACKGROUND OF THE INVENTION

This invention relates generally to displacement detection apparatus, and more particularly, is directed to an optical triangulation displacement sensor.

In conventional optical triangulation displacement sensors, a radiant or infrared ray, such as laser light, is projected on an object in order to measure the distance thereof from a point of reference. A portion of the light is scattered from the surface of the object and is imaged by a converging lens on a detector including a plurality of light sensitive elements, such as photodetectors, arranged at fixed distances from the object. If the surface of the object is displaced so that the light spot is shifted along the path of the laser beam, the image of the light spot on the detector is also shifted. The distance to the object is measured by determining which light sensitive element receives the most light reflected from the object. Examples of such devices are described in U.S. Pat. Nos. 4,274,735 to Tamura et al, 4,522,492 to Masunaga, and 4,733,969 to Case et al. See also, U.S. Pat. Nos. 4,660,970 to Ferrano, 4,873,449 to Paramythioti et al and 4,897,536 to Miyoshi.

It is known that the relation between displacement of the light spot on the object surface and the displacement of the image of the light spot on the detector array is non-linear. However, prior art optical displacement sensors have generally used a linear approximation of the non-linear relation. Methods for displacement measurement that recognize the existence of a non-linear relationship have also been proposed. In U.S. Pat. No. 4,705,395 to Hageniers, a reference surface on an encoded table is used to calibrate the output of a triangulation sensor measuring distance. The table is moved through several steps and the various points are used to obtain a calibration curve via a least squares fit, this being the best choice for a third-order polynomial. Once the sensor has been taken through the calibration and the appropriate polynomial coefficients have been determined, then the system is structured such that the photodiode array reading is used to operate in a look-up table fashion for readout. Then, when the sensor is used, and an actual reading is required, the diode array reading is used as an address in the look-up table to provide a quick answer for the desired measurement.

However, not only is the polynomial an approximation, so that the exact non-linear relation is not known from this patent, but also, this patent provides a fitted polynomial based on test data. In other words, it is based only on experimental data. This means that, for each situation, experimental data must be provided, which is extremely burdensome. In addition, a look-up table must then be provided, which occupies memory space.

See also U.S. Pat. Nos. 4,864,147 and 4,761,546, both to Ikari et al, which disclose linearity correcting means to provide a mathematical correction number to correct any non-linearity of the measured distance signal, in order to provide linearity to the measured distance signal.

With these latter patents, the non-linear relation which is linearized, is provided only for the situation where the detector array is perpendicular to the optical axis of the receiving lens. As a result, there is no consideration of the angle $\phi$ between the optical axis of the receiving lens and the orientation of the photodetector. However, if the angle $\phi$ changes, as is common, the non-linear relation of this patent does not apply.

In this regard, this angle $\phi$ will generally be other than 90 degrees. This is because, with the angle $\phi$ equal to 90 degrees, light reflected from the object and through the receiving lens, will not focus properly on the position detector. In other words, to maintain the condensed light in a good focused condition, the photodetector has to be oriented at an angle $\phi$ to the optical axis of the receiving lens. The value of the angle $\phi$ depends on the design parameters of the triangulation device and is given by the formula: $\tan \phi = (d_o/d_i) \tan \theta$.

U.S. Pat. No. 4,655,586 to Stauffer discloses an adjustable zone proximity sensor utilizing two pairs of detectors, at least one of which is adjustable in position so as to produce unique signals when an object is in a near zone, medium zone and far zone. However, adjustment of the detectors is made in accordance with the distance from the object, and not on the basis of a non-linearity correction.

Other devices of related interest, but of less importance, are those described in U.S. Pat. Nos. 3,661,465 to Groh, 4,004,852 to Pentecost, 4,368,383 to Shirasu et al, 4,900,146 to Penney et al, and 4,902,130 to Bouillot et al.

OBJECTS AND SUMMARY OF THE INVENTION

Accordingly, it is an object of the present invention to provide an optical triangulation displacement sensor that overcomes the aforementioned problems with the prior art.

It is another object of the present invention to provide an optical triangulation displacement sensor in which an exact non-linear relation is used for processing the measured data.

It is still another object of the present invention to provide an optical triangulation displacement sensor that has improved accuracy.

It is yet another object of the present invention to provide an optical triangulation displacement sensor that reveals the variation in measurement resolution.

It is a further object of the present invention to provide an optical triangulation displacement sensor which provides a larger measuring range.

It is a still further object of the present invention to provide an optical triangulation displacement sensor in which uniform resolution is provided within the measuring range.

It is another object of the present invention to provide an optical triangulation displacement sensor having a larger working area without increasing the size of the detector array.

It is still another object of the present invention to provide an optical triangulation displacement sensor that determines the surface displacement ▲ as a function of the angle $\theta$, the angle $\phi$ and the image displacement $\delta$, with an exact relation therebetween for all angles $\phi$.

In accordance with an aspect of the present invention, an optical displacement measuring apparatus utilizing triangulation, includes projecting means for projecting a light beam with a first optical axis onto a surface of an object whose displacement is to be measured; detector means for receiving light reflected from the object and for generating a positional signal as an image displacement $\delta$; light receiving means for receiving the light reflected from the object and for supplying the reflected light to the detector means along a second optical axis intersecting the first optical axis at an angle $\theta$, the detector means being inclined at an angle $\phi$ with respect to the second optical axis; determining means for non-linearly determining surface displacement ▲ as a function of the image displacement $\delta$ and the angles $\phi$ and $\theta$, with the relationship between the image displacement $\delta$, the surface displacement ▲ and the angles $\phi$ and $\theta$ always being identical, regardless of the angle $\phi$.

The above and other objects, features and advantages of the present invention will become readily apparent from the following detailed description which is to be read in connection with the accompanying drawings.

BRIEF DESCRIPTION OF THE DRAWINGS

FIG. 3 is a graphical plot of the ▲-$\delta$ curve for the optical triangulation displacement sensor of FIG. 1;

FIG. 4 is a graphical diagram of the displacement error as a result of using the linear approximation of the prior art, in comparison with the actual ▲-$\delta$ curve of FIG. 3;

DETAILED DESCRIPTION OF THE PREFERRED EMBODIMENTS

Figure 1:
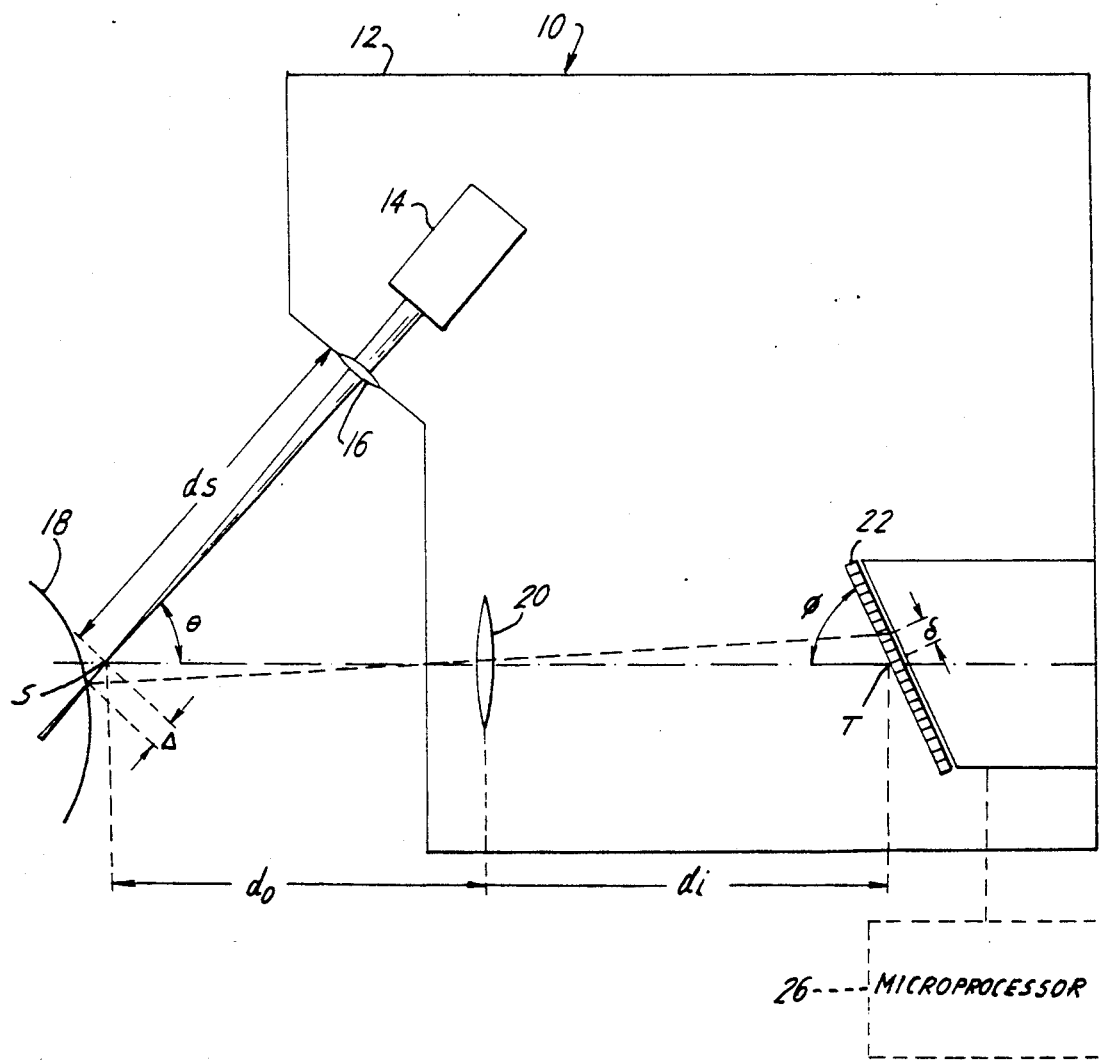
FIG. 1 is a schematic diagram of a known optical triangulation displacement sensor with which the present invention can be used.

Referring to the drawings in detail, and initially to FIG. 1 thereof, a known optical triangulation displacement sensor 10 includes a housing 12 containing a light source 14 such as a laser. A converging lens 16 is mounted in a wall or inside of housing 12, and the light ray from light source 14 is projected by lens 16 onto an object 18, the distance of which is to be measured from a reference point. The light is reflected from object 18, through a receiving lens 20, and to an array 22 of photodetectors, such as photodiodes, phototransistors or the like, in known manner. Thereafter, the signals from array 22 are processed, for example, by a microprocessor 26 to compute the distance to object 18.

Figure 2:
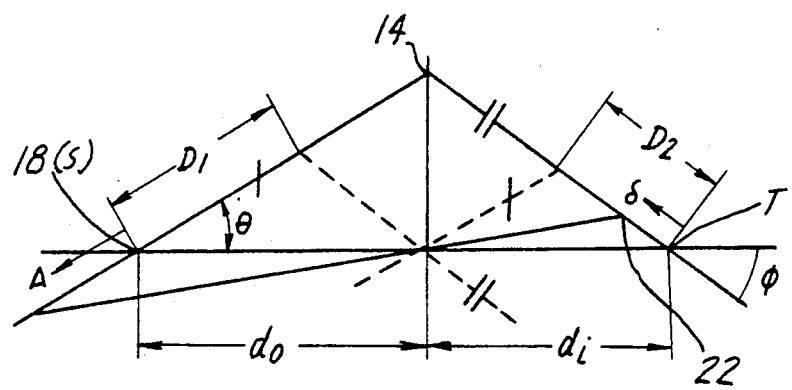
FIG. 2 is a graphical diagram showing the physical parameters of the optical triangulation displacement sensor of FIG. 1.

The parameters for calculation of the distance measurement with known optical triangulation displacement sensor 10 are shown in FIGS. 1-3. Specifically, the angle $\theta$ is the angle between the optical axis of receiving lens 20 and the light ray from light source 14; the angle $\phi$ is the angle between the optical axis of converging lens 20 and the orientation of detector array 22; the point T is the point of intersection between detector array 22 and the optical axis of lens 20; the point S is the point of intersection between the light ray and the optical axis of lens 20; the surface displacement ▲ is the distance between the point S and the point of impingement of the light ray on the object surface; $d_o$ is the distance between the point S and the center of lens 20; and $d_i$ is the distance between the point T and the center of lens 20. It is assumed that the lens is extremely thin, and therefore, for all practical purposes, has no thickness. It will, of course, be appreciated that the values for the angles and distances shown in FIG. 2 are different than those shown in FIG. 1 for ease of explanation. With known optical triangulation displacement sensor 10, the following linear relation is used to convert detected image displacement $\delta$ into surface displacement or distance ▲:

$$= (d_o \sin \phi / d_i \sin \theta) \delta \qquad (1),$$

However, the applicants herein have determined that image displacement $\delta$ is related to surface displacement ▲ in a non-linear manner, as follows:

$$\delta = \frac{d_i \sin\theta \Delta}{\Delta \sin(\theta + \phi) + d_o \sin\phi} = \qquad (2)$$

$$\frac{D_2 \Delta}{\Delta + D_1} = D_2 \left(1 - \frac{D_1}{\Delta + D_1}\right).$$

where $$D_1 = \frac{d_o \sin\phi}{\sin(\theta + \phi)} \qquad (3)$$

and $$D_2 = \frac{d_i \sin\theta}{\sin(\theta + \phi)}. \qquad (4)$$

Therefore, since the angles $\phi$ and $\theta$ can easily be measured, along with the distance $\delta$, the surface displacement ▲ can be determined as follows:

$$\Delta = \frac{D_1 \delta}{D_2 - \delta}. \qquad (5)$$

Thus, with the distance $\delta$ determined by detector array 22, and angles $\phi$ and $\theta$ measured, the surface displacement ▲ of object 18 can be determined in an accurate manner.

As shown in FIG. 3, the parameters $D_1$ and $D_2$, shown by equations (3) and (4), define the asymptotes of the ▲-$\delta$ curve. In fact, the linear approximation used in the prior art is the tangent line 24 to the curve which passes through the origin. This is because such tangent line 24 gives the best linear approximation. It is therefore clear that there is a displacement error resulting from such linear approximation, which error is given as a function of $\beta$, a dimensionless quantity, where $\beta = \delta/D_2$.

Figure 5:
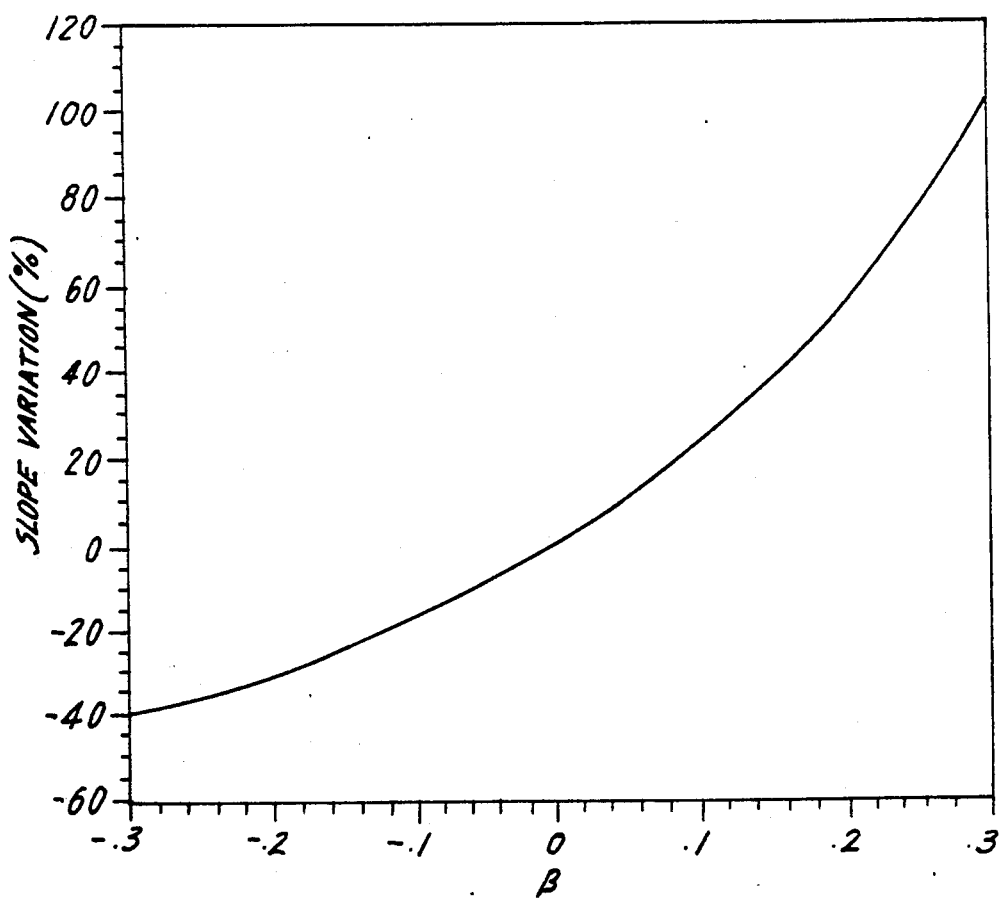
FIG. 5 is a graphical diagram of the slope variation of the linear approximation of the prior art, in comparison with the actual ▲-$\delta$ curve of FIG. 3.

It will be appreciated that the measurement resolution is closely related to the known size of each element of detector array 22 and the slope of the ▲-$\delta$ curve of FIG. 3. With the linear approximation of the prior art, the resolution is treated as a constant since the substantially linear approximation of tangent line 24 is used. However, in reality, the resolution will vary in accordance with the actual ▲-$\delta$ curve of FIG. 3. The displacement error as a result of using the linear approximation of the prior art, is shown in FIG. 4, while the variation in slope of the ▲-$\delta$ curve is shown in FIG. 5.

It will therefore be appreciated that, in consideration of both accuracy and resolution, and as a result of using the aforementioned linear approximation, the prior art optical triangulation displacement sensor 10 can only be used in a very limited working range in the neighborhood of the origin of the curve of FIG. 3. By using the exact displacement relation of Equation 5 in microprocessor 26 (FIG. 1) connected with the output of detector array 22, a much larger working range can be achieved, with high accuracy.

Although the above non-linear relationship of Equation 5 has been provided by microprocessor 26, it will be appreciated that a hard-wired circuit 29 can provide the same result. An example of such a circuit is shown in FIG. 6.

Figure 6:
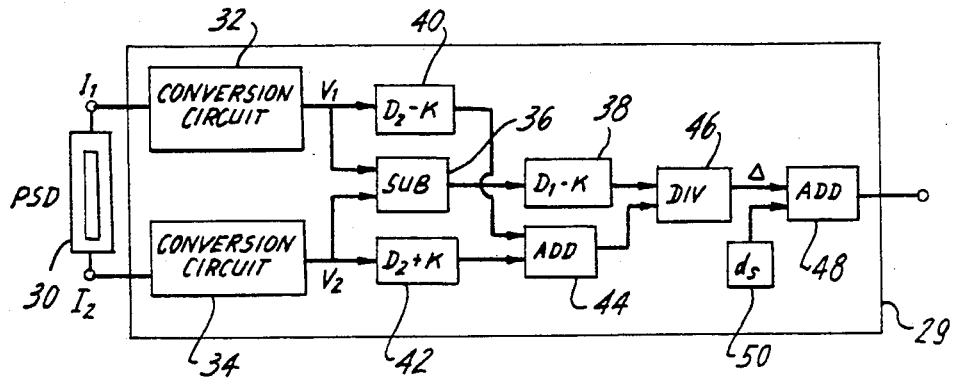
FIG. 6 is a block diagram of a circuit according to another embodiment of the present invention for non-linearly measuring distance to an object.

It will be appreciated, however, that the circuit 29 of FIG. 6 is only one example of use with a particular photodetector, namely a position sensitive detector, and that other circuitry can be provided with different detectors. The circuit 29 of FIG. 6 therefore processes a signal from a position sensitive detector (PSD) 30 according to the non-linear relation of Equation 5.

Specifically, as shown in FIG. 6, position sensitive detector 30 produces output position current signals $I_1$ and $I_2$ corresponding to the displaced distance $\delta$ of the light spot from the center of position sensitive detector 30. The distance $\delta$ is related to current signals $I_1$ and $I_2$ as follows:

$$\delta = k \frac{I_1 - I_2}{I_1 + I_2}, \quad (6)$$

where k is a constant of position sensitive detector 30. See U.S. Pat. No. 4,864,147 for this relation.

The output current signals $I_1$ and $I_2$ are supplied to current-to-voltage conversion circuits 32 and 34, respectively, which amplify and convert current signals $I_1$ and $I_2$ to voltage signals $V_1$ and $V_2$. Accordingly, after such conversion, the distance $\delta$ is related to signals $V_1$ and $V_2$ as follows:

$$\delta = K \frac{V_1 - V_2}{V_1 + V_2}. \quad (7)$$

From equations 5 and 7, it will be appreciated that the surface distance ▲ can be determined as follows:

$$\Delta = \frac{D_1 K(V_1 - V_2)}{(D_2 - K)V_1 + (D_2 + K)V_2}, \quad (8)$$

which is a particular application of the general Equation 5 for this particular type of detector.

Thus, in accordance with Equation 8, the output signals $V_1$ and $V_2$ from conversion circuits 32 and 34 are supplied to a subtraction circuit 36 where signal $V_2$ is subtracted from signal $V_1$ to provide a first operational signal ($V_1$-$V_2$), which is supplied to an operational amplifier 38 that amplifies the signal by a factor $D_1K$ to provide a signal $D_1K(V_1$-$V_2)$. The factor K is a constant and the value for $D_1$ is determined by Equation 3.

Further, the output signals $V_1$ and $V_2$ are supplied to operational amplifiers 40 and 42, respectively, to produce signals $(D_2-K)V_1$ and $(D_2+K)V_2$, both of which are then added in an adder 44. The output signal from operational amplifier 38 is then divided by the output signal from adder 44 in a divider circuit 46 to produce the surface distance ▲ in accordance with Equation 8. Finally, surface displacement ▲ can be added in an adder 48 to the stand-off distance $d_s$ supplied from a stand-off memory 50, to provide the actual distance to the object.

Figure 7:
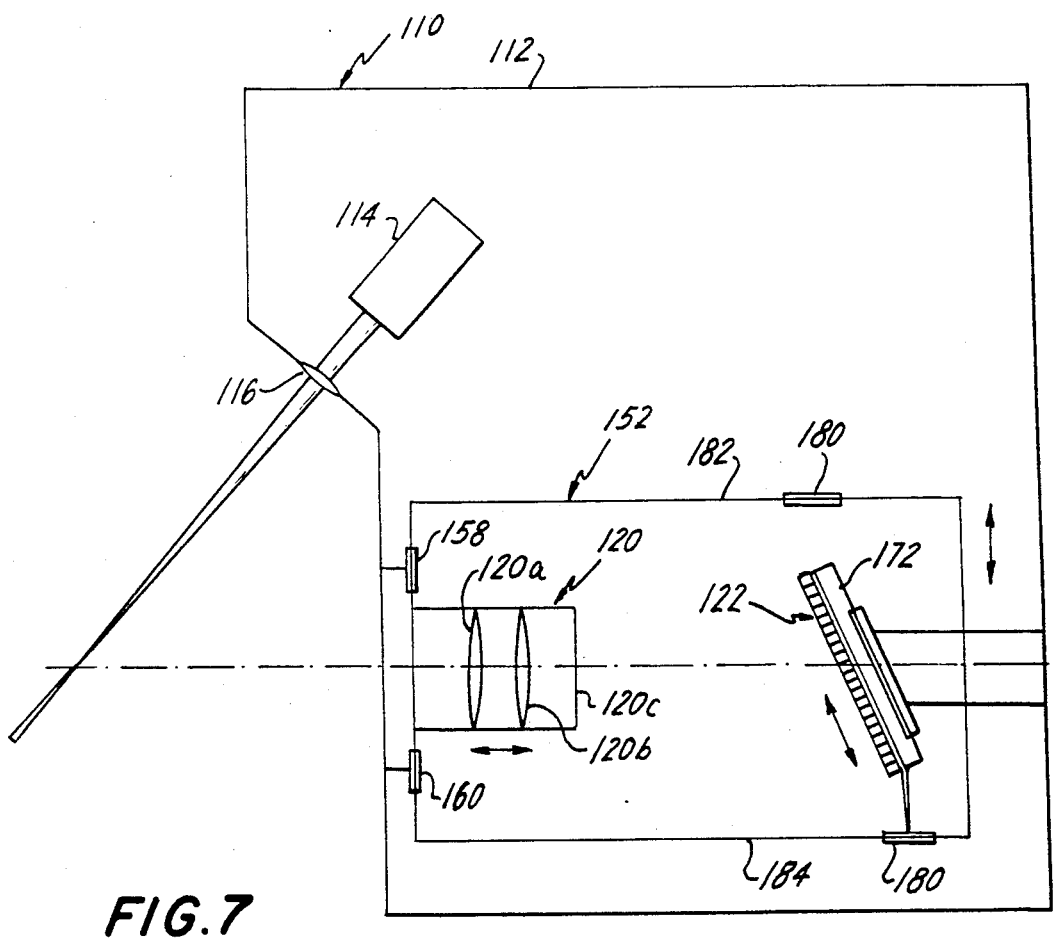
FIG. 7 is a schematic diagram of an optical triangulation displacement sensor according to another embodiment of the present invention.

The working range and resolution can be improved by designing an adjustable triangulation displacement sensor 110, as shown in FIG. 7. For each adjustable position of FIG. 7, the relationships of Equations 5 and 8 hold. This embodiment of the present invention will now be described in which elements corresponding to optical triangulation displacement sensor 10 of FIG. 1 are identified by the same reference numerals, augmented by 100, and a detailed description of such common elements will be omitted herein for the sake of brevity.

Specifically, optical triangulation displacement sensor 110 includes a frame 152 movably positioned within housing 112. Receiving lens system 120 comprised of lenses 120a and 120b, and detector array 122, are mounted within frame 152.

Specifically, frame 152 includes an upper front rod 154 extending vertically upward and a lower front rod 156 extending vertically downward. Upper front rod 154 extends through an upper prismatic guide 158 secured to the front end of housing 112, and in like manner, lower front rod 156 extends through a lower prismatic guide 160 also secured to the front end of housing 112. As a result, frame 152 is constrained to move in the vertical direction of FIG. 9.

In order to move frame 152 in such manner, a pinion 162 that can be turned manually or is mounted on the output shaft 164 of an actuator motor (not shown) mounted to housing 112, is engaged with a rack 166 having gear teeth, at the side of frame 152. Accordingly, rotation of pinion 162 results in vertical movement of frame 152.

Figure 8:
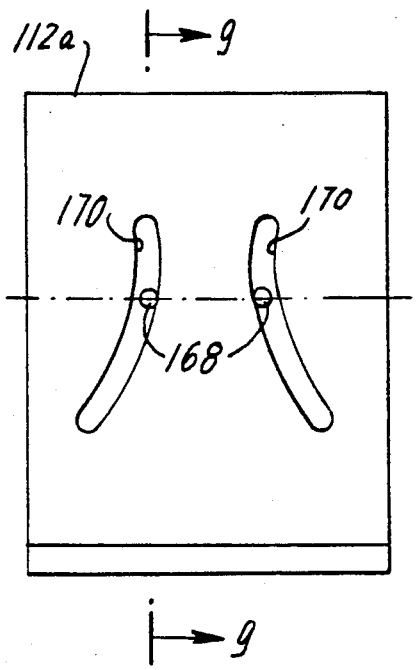
FIG. 8 is a partial side view of the sensor of FIG. 7.
Figure 9:
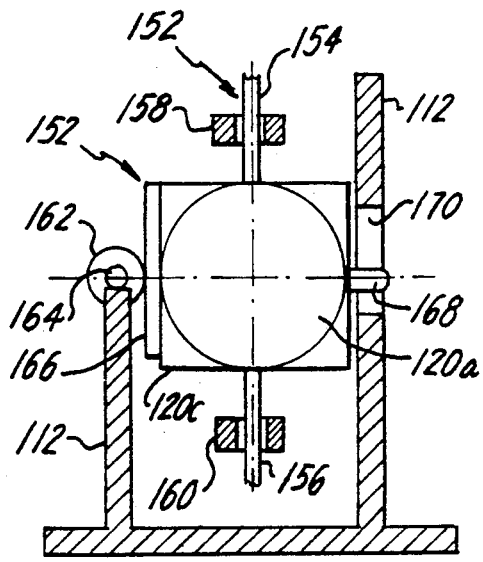
FIG. 9 is a cross-sectional view of the sensor of FIG. 8, taken along line 9—9 thereof.

As shown in FIGS. 8 and 9, lenses 120a and 120b are mounted in parallel, spaced relation within a lens casing 120c which is fixed to frame 152. Each lens 120a and 120b has a pin 168 secured to a side thereof, each pin 168 extending through a respective curved guide slot 170 within a side wall 112a of housing 112. As shown in FIGS. 8 and 9, guide slots 170 diverge from each other in the downward vertical direction. Accordingly, as frame 152 is moved downwardly in the vertical direction, along prismatic guides 158 and 160, pins 168 riding in slots 170 cause lenses 120a and 120b to move apart from each other along their optical axes, and vice versa.

Figure 10:
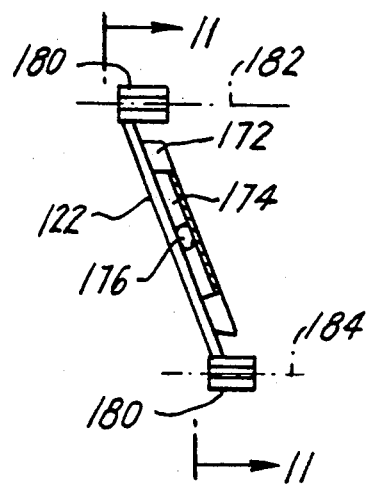
FIG. 10 is a side view of the detector array and movable mounting thereof.
Figure 11:
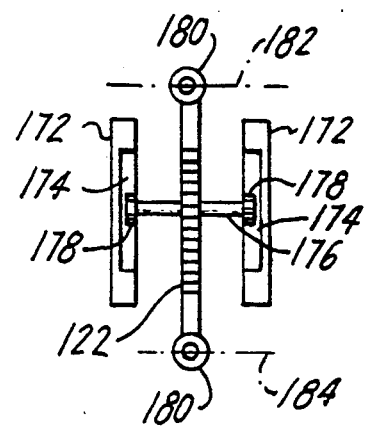
FIG. 11 is a front view of the detector array and movable mounting thereof of FIG. 10, viewed along line 11—11 thereof.

Further, as shown in FIGS. 7, 10 and 11, two parallel, spaced prismatic guides 172 are secured to the rear wall of housing 112 at the same angle as detector array 122, and immediately behind detector array 122. Each prismatic guide 172 includes an inner trackway 174, with the inner trackways 174 facing each other. A cross bar 176 has a roller 178 at each end, with each roller 178 riding within one trackway 174, so that movement of cross bar 176 is restricted along prismatic guides 172.

Detector array 122 is fixed to the center of cross bar 176 and extends at the same angle as prismatic guides 172, and parallel thereto. The opposite ends of detector array 122 are formed with cylindrical guides 180 that are constrained to move horizontally along upper and lower horizontal members 182 and 184 of frame 152.

Accordingly, movement of frame 152 in the vertical direction along prismatic guides 158 and 160, results in movement of cross bar 176, and thereby detector array 122, along prismatic guides 172. Accordingly, detector array 122 is moved in the horizontal direction by guides 180, along the optical axes of lenses 120a and 120b.

It will be appreciated that the mechanical arrangement of FIGS. 7-11 provides additional improvements over the electrical arrangements of FIGS. 1 and 6. This is because, with the electrical arrangements of FIGS. 1 and 6, resolution of the detectors of array 22 may not be capable of distinguishing movements of object 18 that are too small, that is, for small movements of object 18, there may be no discernible change in $\delta$. As a result, the electrical arrangements of FIGS. 1 and 6 may be limited in their range of movement of the object, in order to obtain a satisfactory resolution.

With the mechanical arrangement of FIGS. 7-11, on the other hand not only is the relationship of Equation 5 met, but also, operation with a larger range of movement of object 18 is permitted, and the resolution of measurement is improved as a result of physical adjustment of lenses 120a and 120b.

Figure 12:
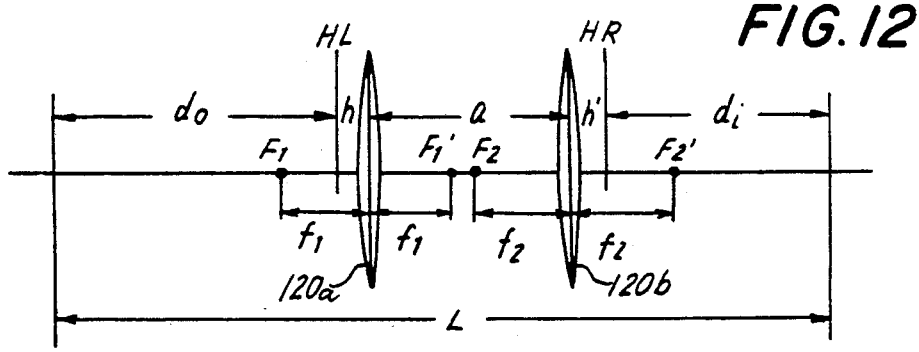
FIG. 12 is a graphical diagram used for explaining the optical parameters for the sensor of FIG. 7.

Referring now to FIG. 12, there is shown a graphical diagram of the various parameters of lenses 120a and 120b in FIG. 7. $H_L$ and $H_R$ are the left and right principal surfaces or planes of an equivalent single lens system. If the focal lengths of lenses 120a and 120b are equal to $f_1$ and $f_2$, respectively, then the effective focal length $f^*$ is defined as follows:

$$f^* = \frac{f_1 f_2}{f_1 + f_2 - a}, \tag{9}$$

and h' and h are:

$$h' = -\frac{af^*}{f_1}, \tag{10}$$

and $$h = -\frac{af^*}{f_2}, \tag{11}$$

where a is the distance between the centers of lenses 120a and 120b, h is the distance between the left principal plane $H_L$ and lens 120a, and h' is the distance between the right principal plane $H_R$ and lens 120b. Focal lengths $f_1$ and $f_2$ correspond to the distances from the centers of the respective lenses to the respective focal points $F_1$, $F_1'$, $F_2$ and $F_2'$.

Figure 13:
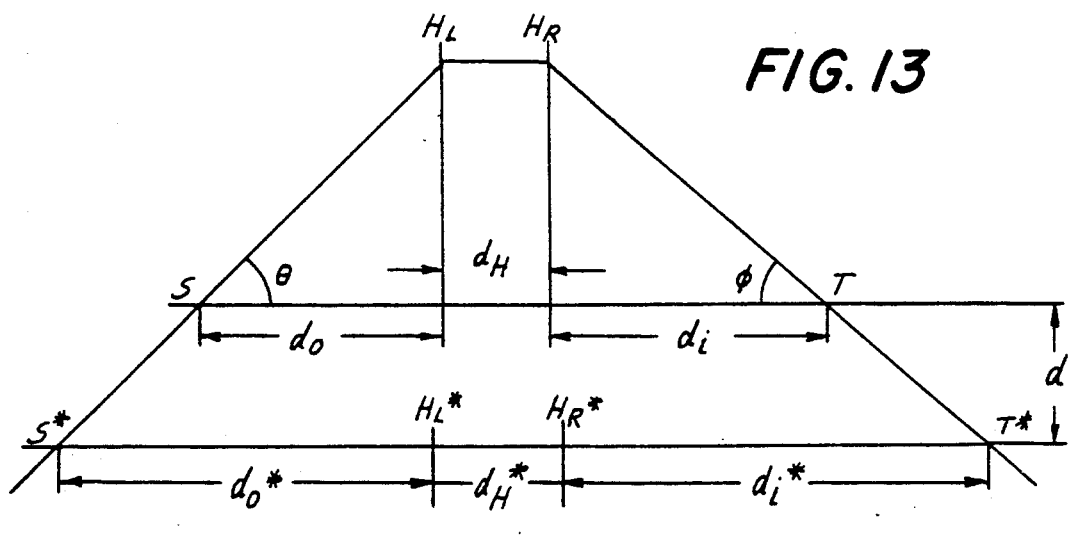
FIG. 13 is a graphical diagram used for explaining the change in various parameters due to movement of the frame of FIG. 7.

Referring now to FIG. 13, there is shown a graphical diagram of the various parameters of the mechanical arrangement of FIGS. 7-11. After frame 152 has moved a distance from its original position, normal to the optical axes of lenses 120a and 120b, all parameters except $\theta$ and $\phi$ are changed. The new parameters are indicated with an asterisk (*) in FIG. 13.

In order to achieve proper adjustment in view of these new parameters, two conditions must be met, namely:

$$d_o/d_i = d^*_o/d^*_i \tag{12},$$

and $$L^* = S^*T^* = d^*_o + d^*_H + d^*_i \tag{13},$$

where $d_H$ is the distance between $H_L$ and $H_R$.

Equation 12 presents a first condition necessary for maintaining the angle $\phi$ constant, while also maintaining a sharp focus. Equation 13 presents a second condition which is a geometric constraint. Satisfaction of these two conditions is achieved through adjustment of the positions of lenses 120a and 120b.

The applicants herein have derived from Equations 9-13 that the distance "a" between lenses 120a and 120b, is related to known design parameters $f_1$, $f_2$, $\tau(=d_o/d_i)$ and L in accordance with the following equation:

$$a = L/2[1 - \sqrt{1 - 4(f_1 + f_2)/L + 4(\tau + 1)^2 f_1 f_2/\tau L^2}\,]. \tag{14}$$

The distance "a" between lenses 120a and 120b, as frame 152 is displaced by a distance d, should be adjusted by replacing L in Equation 14 with $L^*$ in accordance with the following relation:

$$L^* = L + d/\tan\theta + d/\tan\phi = L + d(\pi + 1)/\pi \tan\theta \tag{15}.$$

In order to reduce the complexity, lenses 120a and 120b having identical focal lengths are selected, that is, $f_1 = f_2 = f$. As a result, h=h', and Equation 9 reduces as follows:

$$f^* = \frac{f^2}{2f - a}. \tag{16}$$

Accordingly, Equation 14 reduces as follows:

$$a = L/2[1 - \sqrt{1 - 8f/L + 4(\tau + 1)^2 f^2/\tau L^2}\,]. \tag{17}$$

Accordingly, with Equation 17, the curvature of slots 170 are determined in order to move lenses 120a and 120b.

Figure 14:
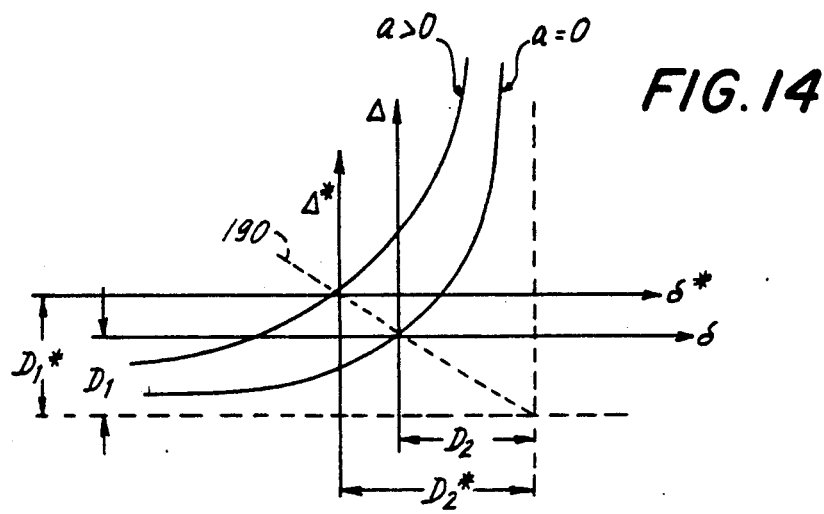
FIG. 14 is a graphical diagram used for explaining the change in various operative parameters due to the sensor of FIG. 7.

Thus, as shown best in FIG. 14, although the -$\delta$ curve is changed with movement of frame 152 in the arrangement of FIGS. 7-11, the slopes at the two origins are the same. The origins are shown by the intersection of the dashed line 190 with the curves. As a result, the resolutions at both the old and new reference points are identical. The working range is increased, with uniform measurement resolution maintained over the working range.

Thus, with the present invention, an optical triangulation displacement sensor is provided in which an exact non-linear relation is used for processing the measured data, so as to provide improved accuracy and better resolution in a larger measuring range and regardless of the angle $\phi$ that is used. Further, a uniform resolution is provided within the measuring range. This is also accomplished without increasing the size of the detector array.

Having described specific preferred embodiments of the invention with reference to the accompanying drawings, it will be appreciated that the present invention is not limited to those precise embodiments, and that various changes and modifications may be effected therein by one of ordinary skill in the art without departing from the scope or spirit of the invention as defined in the appended claims.

What is claimed is:

1. An optical displacement measuring apparatus utilizing triangulation, comprising:
   projecting means for projecting a light beam with a first optical axis onto a surface of an object whose displacement is to be measured;
   detector means for receiving light reflected from the object and for generating a positional signal as an image displacement $\delta$;
   light receiving means for receiving the light reflected from the object and for supplying said reflected light to said detector means along a second optical axis intersecting said first optical axis at angle $\theta$, said detector means being inclined at angle $\phi$ with respect to said second optical axis;
   determining means for non-linearly determining surface displacement $\blacktriangle$ as a function of said image displacement $\delta$ and said angles $\phi$ and $\theta$, with the relationship between said image displacement $\delta$, said surface displacement $\blacktriangle$ and said angles $\phi$ and $\theta$ always being identical, regardless of the angle $\phi$.

2. An optical displacement measuring apparatus according to claim 1, wherein said detector means includes at least one photodetector.

3. An optical displacement measuring apparatus according to claim 2, wherein said detector means includes a plurality of photodetectors.

4. An optical displacement measuring apparatus according to claim 1, wherein said angle $\phi$ is less than 90 degrees.

5. An optical displacement measuring apparatus according to claim 1, wherein said light receiving means includes a condensing lens.

6. An optical displacement measuring apparatus according to claim 1, wherein said projecting means includes laser means for generating a laser beam as said light beam, and a lens for projecting said laser beam on the surface of the object.

7. An optical displacement measuring apparatus utilizing triangulation, comprising:
   projecting means for projecting a light beam with a first optical axis onto a surface of an object whose displacement is to be measured;
   detector means for receiving light reflected from the object and for generating a positional signal as an image displacement $\delta$;
   light receiving means for receiving the light reflected from the object and for supplying said reflected light to said detector means along a second optical axis intersecting said first optical axis at angle $\theta$, said detector means being inclined at angle $\phi$ with respect to said second optical axis;
   determining means for non-linearly determining surface displacement $\Delta$ as a function of said image displacement $\delta$ and said angles $\phi$ and $\theta$, with the relationship between said image displacement $\delta$, said surface displacement $\Delta$ and said angles $\phi$ and $\theta$ always being identical, regardless of the angle $\phi$, said determining means including means for non-linearly determining said image displacement $\Delta$ in accordance with the equation:

$$\Delta = \frac{D_1 \delta}{D_2 - \delta}$$

where $D_1$ and $D_2$ as follows:

$$D_1 = \frac{d_o \sin\phi}{\sin(\theta + \phi)}$$

$$D_2 = \frac{d_i \sin\theta}{\sin(\theta + \phi)}$$

and $d_o$ is the distance between the center of said light receiving means and the point of intersection between said light beam and the second optical axis, $d_i$ is the distance between the center of said light receiving means and the point of intersection between said detector means and said second optical axis.

8. An optical displacement measuring apparatus according to claim 7, wherein said determining means includes microprocessor means for non-linearly determining said surface displacement $\blacktriangle$ in accordance with the equation:

$$\Delta = \frac{D_1 \delta}{D_2 - \delta}$$

9. An optical displacement measuring apparatus according to claim 7, wherein said detector means produces at least one current signal in correspondence with said image displacement $\delta$, and said determining means includes circuit means for producing an output signal corresponding to said surface displacement $\blacktriangle$ in response to said at least one current signal.

10. An optical displacement measuring apparatus according to claim 9, wherein said detector means includes a position sensitive detector which produces first and second current signals in correspondence with said image displacement $\delta$; and said circuit means includes:
   a) conversion means for converting said first and second current signals to first and second voltage signals, respectively;
   b) first amplifier means for multiplying said first and second voltage signals by values $(D_2 - K)$ and $(D_2 + K)$, respectively, to produce first and second multiplied signals, wherein K is a constant;
   c) adder means for adding said first and second multiplied signals to produce an added signal;
   d) subtractor means for subtracting said second voltage signal from said first voltage signal to produce a subtracted signal;
   e) second amplifier means for multiplying said subtracted signal by a value $D_1 K$ to produce a third multiplied signal; and
   f) divider means for dividing said third multiplied signal by said added signal to produce an output signal corresponding to said surface displacement 11. An optical displacement measuring apparatus according to claim 10, wherein said projecting means includes light source means for generating said light beam.

12. An optical displacement measuring apparatus according to claim 11, wherein said circuit means further includes means for producing a stand-off signal corresponding to the distance between said light source means and the point of intersection between the light beam and the optical axis of said light receiving means, and means for adding said stand-off signal to said output signal corresponding to surface displacement.

13. An optical displacement measuring apparatus utilizing triangulation, comprising:

projecting means for projecting a light beam with a first optical axis onto a surface of an object whose displacement is to be measured;

detector means for receiving light reflected from the object and for generating a positional signal as an image displacement $\delta$;

light receiving means for receiving the light reflected from the object and for supplying said reflected light to said detector means along a second optical axis intersecting said first optical axis at angle $\theta$, said detector means being inclined at angle $\phi$ with respect to said second optical axis;

determining means for non-linearly determining surface displacement $\Delta$ as a function of said image displacement $\delta$ and said angles $\phi$ and $\theta$, with the relationship between said image displacement $\delta$, said surface displacement $\Delta$ and said angles $\phi$ and $\theta$ always being identical, regardless of the angle $\phi$, said determining means including a frame movable in a direction transverse to the optical axis of said light receiving means; and said light receiving means is fixed for movement with said frame in said transverse direction and includes a first lens, a parallel, spaced second lens and means for mounting said first and second lenses for movement toward and away from each other along their optical axes.

14. An optical displacement measuring apparatus according to claim 13, wherein said determining means includes guiding means for guiding movement of said first and second lenses along their optical axes.

15. An optical displacement measuring apparatus according to claim 14, wherein said guiding means guides movement of said first and second lenses along their optical axes so that the spacing "a" between physical centers of said first and second lens is as follows:

$$a = L/2[1 - \sqrt{1 - 4(f_1 + f_2)/L + 4(\tau + 1)^2 f_1 f_2/\tau L^2}\ ]$$

where $f_1$ is the focal length of the first lens, $f_2$ is the focal length of the second lens, $\tau = d_o/d_i$, $d_o$ is the distance between the left principal plane of an equivalent single lens system and a point of intersection S between said light beam and said second optical axis, $d_i$ is the right principal plane of said equivalent single lens system and a point of intersection T between said detector means and said second optical axis, and L is the distance between the points of intersection S and T.

16. An optical displacement measuring apparatus according to claim 14, wherein said guiding means includes guiding walls defining first and second guide slots therein, and said first and second lenses each include a pin extending within said first and second guide slots so as to adjust the spacing between said lenses upon movement of said frame in said transverse direction.

17. An optical displacement measuring apparatus utilizing triangulation, comprising:

projecting means for projecting a light beam with a first optical axis onto a surface of an object whose displacement is to be measured;

detector means for receiving light reflected from the object and for generating a positional signal as an image displacement $\delta$;

light receiving means for receiving the light reflected from the object and for supplying said reflected light to said detector means along a second optical axis intersecting said first optical axis at angle $\theta$, said detector means being inclined at angle $\phi$ with respect to said second optical axis;

determining means for non-linearly determining surface displacement $\Delta$ as a function of said image displacement $\delta$ and said angles $\phi$ and $\theta$, with the relationship between said image displacement $\delta$, said surface displacement $\Delta$ and said angles 100 and $\theta$ always being identical, regardless of the angle $\phi$, said determining means including a frame movable in a direction transverse to the optical axes of said light receiving means; and further including guide means for guiding movement of said detector means toward and away from said light receiving means along an optical axis thereof while maintaining said angle $\phi$.

18. An optical displacement measuring apparatus according to claim 17, wherein said guide means includes sliding means for slidably mounting said detector means to said frame for movement in a direction along the optical axis of said light receiving means, and a stationary support guide inclined at said angle $\phi$ and along which said detector means rides.

* * * * *